No. 12,722. REISSUED NOV. 19, 1907.

A. W. KNUTSON.

TROLLEY RETRIEVER.

APPLICATION FILED AUG. 19, 1907.

3 SHEETS—SHEET 1.

Witnesses

Edwin L. Bradford

C. C. Wright

Inventor

Alfred W. S. Knutson

By Edward R. Alexander his Attorney

No. 12,722.

REISSUED NOV. 19, 1907.

A. W. KNUTSON.

TROLLEY RETRIEVER.

APPLICATION FILED AUG. 19, 1907.

3 SHEETS—SHEET 2.

Inventor

Alfred W. Knutson

Witnesses

Edwin L. Bradford

C. C. Wright

By Edward R. Alexander

His Attorney

No. 12,722.

REISSUED NOV. 19, 1907.

A. W. KNUTSON.

TROLLEY RETRIEVER.

APPLICATION FILED AUG. 19, 1907.

3 SHEETS—SHEET 3.

Inventor

Alfred W. Knutson

Witnesses

Edwin L. Bradford

C. C. Wright

By Edward R. Alexander his Attorney

UNITED STATES PATENT OFFICE.

ALFRED W. KNUTSON, OF BROOKFIELD, ILLINOIS, ASSIGNOR, BY DIRECT AND MESNE ASSIGNMENTS, TO THE TROLLEY SUPPLY COMPANY, OF CANTON, OHIO, A CORPORATION.

TROLLEY-RETRIEVER.

No. 12,732. Specification of Reissued Letters Patent. Reissued Nov. 19, 1907.

Original No. 711,428, dated October 14, 1902, Serial No. 110,126. Application for reissue filed August 19, 1907. Serial No. 389,319.

*To all whom it may concern:*

Be it known that I, ALFRED W. KNUTSON, a citizen of the United States, residing at Brookfield, in the county of Cook and State of Illinois, have invented new and useful Improvements in Trolley-Retrievers, of which the following is a specification.

My invention relates to an automatic spring-actuated reel for a trolley car rope; and the objects of my improvements are to take up the ordinary slack of the rope in all positions of the trolley, to catch the trolley promptly in case it leaves the wire, to either hold it from flying upward or to draw it downward below the wire, as may be desired, to re-wind the retriever spring when it has acted and to lock the same ready for another action, and to do these things in a sure and positive manner without any special strain or wear on the trolley rope. I accomplish these objects by the mechanism illustrated in the accompanying drawings, in which—

Figure 1:
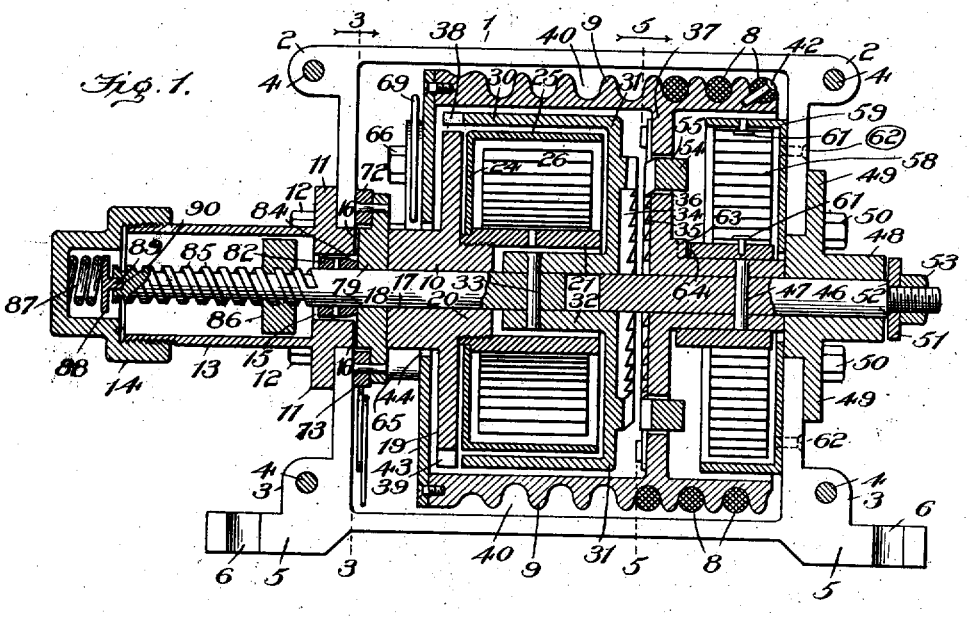
Figure 2:
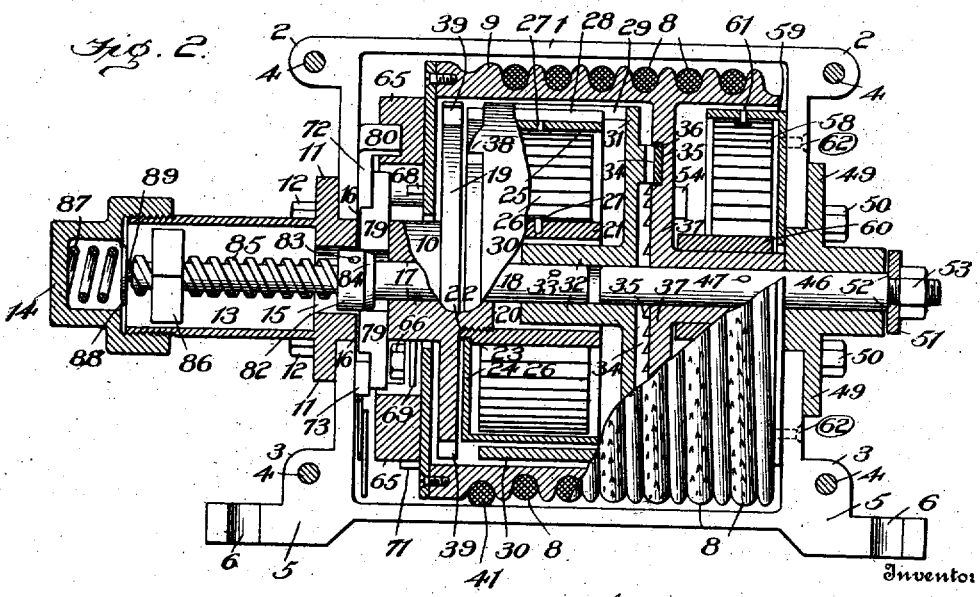
Figure 3:
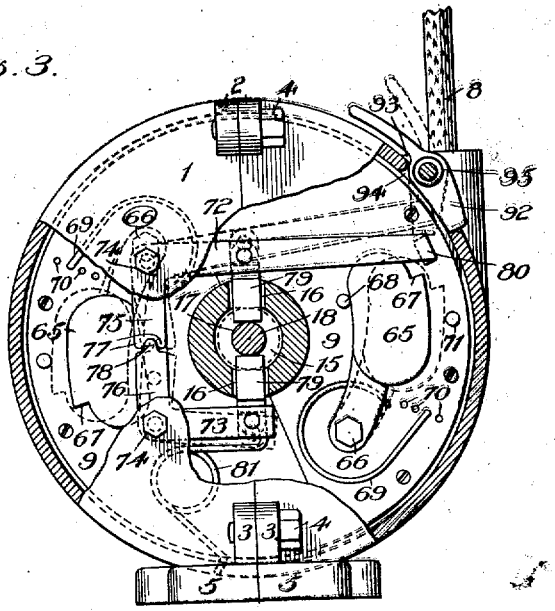
Figure 4:
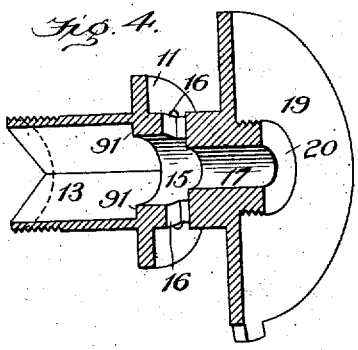
Figure 4A:
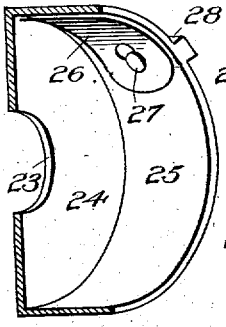
Figure 4B:
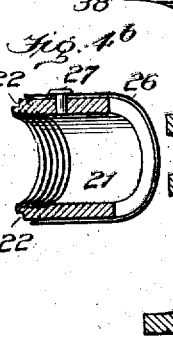
Figure 4C:
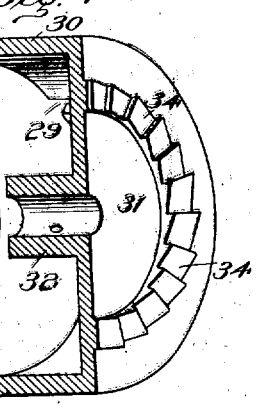
Figure 5:
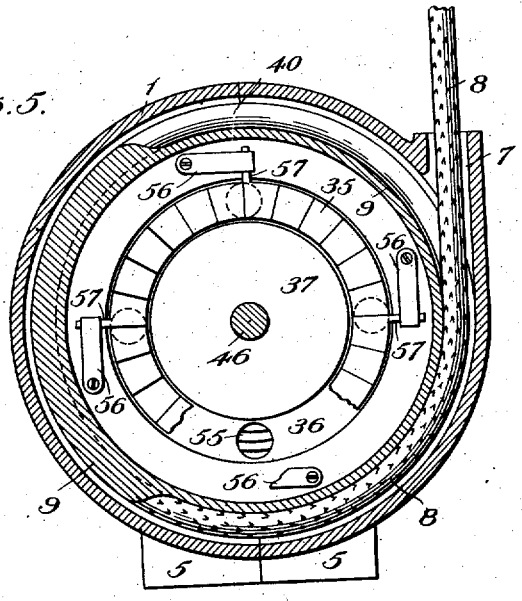

Figure 1 is a vertical longitudinal section of the retriever, showing the retriever spring wound and locked and the tension spring alone in action; Fig. 2, a similar section with some of the parts in elevation, showing the retriever spring in action with the tension spring; Fig. 3, an end elevation with part of the case broken away, showing a vertical cross section on line 3—3, Fig. 1; Figs. 4, 4[a], 4[b], and 4[c] are detached sectional perspective views of the major bearing, the retriever spring shield and hub, and the retriever head in relative position for assembling. Fig. 5 is a vertical cross section on line 5—5, Fig. 1; and Fig. 6, a vertical longitudinal section showing some of the parts in elevation with the retriever spring wound and locked ready to release the reel-rack.

Similar numerals refer to similar parts throughout the drawings.

The case 1 is cylindrical in general shape with closed ends and is preferably made in two lateral parts having the ears 2 and 3 and the bolts 4 for joining them together and the feet 5 for resting on the trolley car. The retriever is preferably placed on the sill or bumper, which usually projects to the rear of the car below the dash-board and above the coupling head, where it can be secured by bolts passing through the apertures 6 in the feet. On one side of the case and opening, preferably, upward is the slot 7 for the trolley ropes 8, which slot corresponds in length with the reel 9.

The major bearing 10 is axially located in one end of the case, to which it is attached by the annular flange 11 and cap-screws 12. Projecting without the case is the nut-guide 13, on the end of which is screwed the adjusting-cap 14, and within the case in the major bearing are formed the collar-socket 15, the bolt-slots 16, the journal bearing 17 for the shifting-shaft 18, the locking disk 19, and the hub-shank 20.

The retriever spring hub 21 may be integral with the hub shank 20; but for convenience in assembling the parts it is formed hollow and screwed onto said shank. The annular groove 22 at the end of the hub 21 loosely receives and guides the central aperture edge 23 of the side plate 24 of the retriever spring shield 25. The retrieve spring 26 is attached at its inner end to the hub 21 and at its outer end to the shield 25 by the rivets 27 or other convenient means, the screw of the hub on the shank being so inclined as to be tightened by the action of the retriever spring. On the shield 25 is the feather 28, which enters the longitudinal slit 29 in the shell 30 of the rack head 31, thus requiring the shield and the head to rotate together, but permitting the head to shift along its axis independently of the shell.

The retriever head 31 is secured on the inner end of the shifting shaft 18 by the hub 32 and pin 33 or other suitable means, which hub 32 freely telescopes within the hub 21. On the face of the retriever head and concentric with its axis is the annular retriever rack 34, which is adapted to mesh with the reel rack 35, which reel rack is formed as a ring and is normally located in the annular groove 36 in the side of the cross partition 37 of the reel, and on the free edge of the shell 30 of the retriever head project the two lugs 38, located diametrically opposite each other and adapted to engage, respectively, with the lugs 39, similarly located on the periphery of the locking disk 19. These parts are relatively so located that when the respective lugs 38 and 39 are in engagement and the reel rack is in its normal position the racks 34 and 35 will clear each other freely, as shown in Fig. 1, and likewise when the racks are in normal engagement the lugs will clear each other freely, as shown in Fig. 2; but when the retriever head is shifted toward the reel rack the racks come into partial engagement before the lugs are clear of each other, so that the retriever head is never without the engagement either of the lugs or of the racks. The retriever spring is wound to the desired efficiency before these parts are assembled.

The rope-reel 9 is a hollow cylinder, with the cross partition 37 intermediate between the ends and preferably having the spiral groove 40 on its periphery for receiving the trolley rope and keeping its winds apart. At one end the groove is formed gradually more shallow, so the rope is forced against the case, as shown at 41 in Fig. 2, thereby acting as a brake to stop the rotation of the reel without jar or shock. At the other end of the reel the lower or inner end of the rope is attached in the groove by the screw 42 or other suitable fastening. The retriever end of the reel is closed by the plate 43, which has a central aperture 44 fitting loosely around the major bearing outside of the locking disk and for convenience is preferably made in two similar lateral parts. The reel hub 45 is formed on the side of the reel partition opposite the reel rack and is attached on the reel shaft 46 by the pin 47 or otherwise.

The outer end of the reel shaft 46 rotates in the minor bearing 48, which is axially located at the end of the case opposite the major bearing, to which end it is attached by the annular flange 49 and cap screws 50. The reel shaft is held from endwise movement by the reel hub against the inner end of the minor bearing and the washer 51 against the outer end thereof. The washer 51 is secured against the shoulder 52 on the reel shaft by the nut 53, and the inner end of the reel shaft rotates in the hub of the retriever head, which gives it additional support and bearing.

Figure 6:
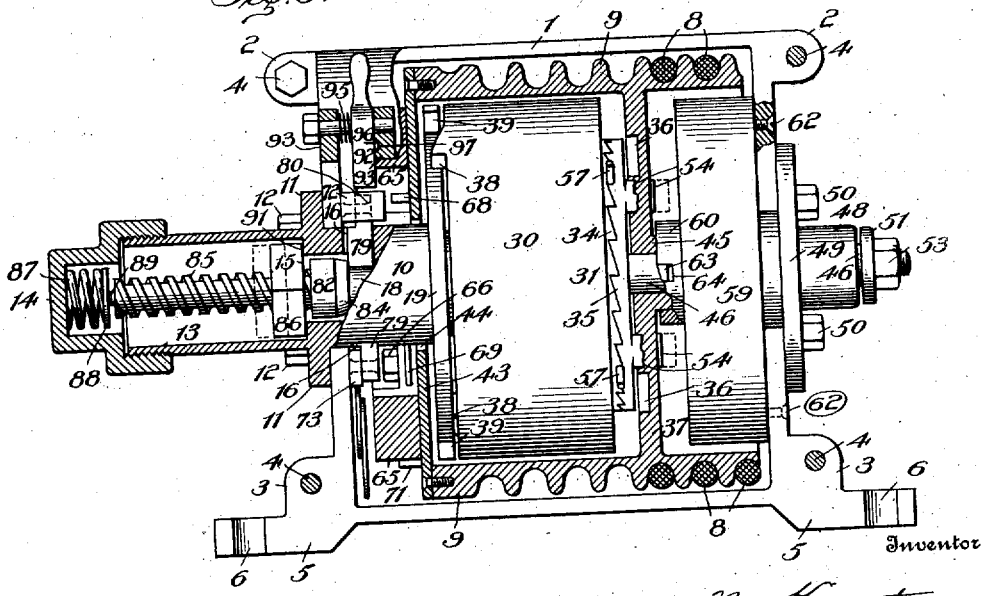

The reel rack 35 normally rests in the annular groove 36 in the reel partition and has projecting from its back face the studs 54, which extend through the corresponding apertures 55 in the reel partition. These studs keep the reel and its rack together with reference to rotation. The reel rack is normally held in its groove by action of the springs 56 against the pins 57, which project from the periphery of the rack, which springs are preferably attached on the inner side of the reel partition, and when the reel rack is withdrawn from its groove, as shown in Fig. 6, these springs act to bring it back as soon as it is free to return.

The tension spring 58 is attached at its outer end to the shield 59 and at its inner end to the collar 60 by the rivets 61 or other suitable means. The tension spring shield is attached to the end of the case by the screws 62 or otherwise, and the collar is mounted on the reel hub 45, whereon it is held from independent rotation by the lug 63 on said hub engaging in the notch 64 in said collar.

The centrifugal dogs 65 are attached at one end by the pivotal bolts 66 on the outer side of the end plate 43 of the reel. On the outer side of the free ends of the dogs are formed the trip-shoulders 67. The centrifugal dogs are normally held in against the stop-pins 68, projecting from the reel end plate, by action of the dog-springs 69, the strength of which springs can be adjusted by means of the holes 70 in the end plate adapted to receive the outer ends of the springs, and the outward movement of the dogs is limited by the stop-pins 71, projecting from said end plate.

The bolt levers 72 and 73 are attached inside to the end of the case, respectively above and below the major bearing, by the pivotal bolts 74, and have respective arms 75 and 76 directed toward each other from the pivotal bolts, with the teeth 77 and 78, respectively, on their ends meshing as cog-wheel sections, which connection causes both levers to act together and in unison. The locking bolts 79 are pivotally connected with the bolt levers, respectively, opposite the bolt-slots 16 and operate through said slots. The bolt lever 72 is extended to a point near the side of the case where the end is bent inward to from the trip arm 80. The lever spring 81, acting from the side of the case against the lower side of the lever 73, serves to keep the locking bolts normally in their locked position inward against the shifting shaft.

The centrifugal dogs and the trip arm are so located with reference to each other that the trip shoulders on the dogs will pass freely inside of the trip arm when the dogs and locking bolts are in their normal positions, but that said shoulders will squarely strike the trip arm when the dogs are thrown out, as indicated by the dotted lines in Fig. 3.

The stop collar 82 is located on the shifting shaft in the socket 15 of the major bearing and may be formed integral with the shaft or attached to it by the pin 83. The inner part of the collar is preferably slightly tapered to form the beveled surface 84. On the shifting shaft, from the stop collar to the outer end, is formed the screw 85, by which is actuated the regulating nut 86, which is located on the shaft. The regulating nut is formed externally with an angular section similar to the internal section of the nut guide 13, whereby the nut is prevented from turning with the shaft, but moves endwise along the shaft when the same is rotated. The screw thread is so pitched that one-half rotation of the shaft will move the nut endwise a distance about equal to the endwise shift of the shaft. The shifting-spring 87 is located in the cap 14, by the adjustment of which cap its power is regulated, and it acts against the end of the shifting shaft, preferably with the intervening disk 88, having a central pin 89 bearing in the socket 90 in the end of the shaft.

The normal position of the parts is shown in Fig. 1, with about three turns of the trolley rope around the reel to give plenty of line for the varying elevation of the trolley and the tension spring being adjusted to keep all slack out of the rope. The retriever spring is wound tight enough to easily overcome the resistance of the trolley spring, and the retriever rack is shifted away from the reel rack, with the lugs of the retriever head engaging the lugs of the locking disk, which engagement stops the rack head from turning, and thereby locks the retrieving mechanism. This position of the retriever head is maintained by the stop collar being held by the locking bolts, and when the parts are in this position the regulating nut is located as far away from the stop shoulder 91 at the mouth of the collar socket as the shaft and retriever head have endwise movement. With the retrieving mechanism thus locked and its rack clear of the reel rack the reel is free to rotate on its shaft, and all slack of the trolley rope is taken up by action of the tension spring. In this moderate movement of the reel the centrifugal dogs are held in their normal inward position by action of the dog springs; but when the rope is vigorously pulled out, as by the trolley leaving the wire, the quicker rotation of the reel throws out the centrifugal dogs by overcoming their springs, and the trip shoulder on the nearest dog strikes the trip arm and throws it upward, as shown by broken lines in Fig. 3, thereby drawing the locking bolts out of engagement with the stop collar. Thereupon the shifting spring shoves the shifting shaft endwise, bringing the retriever rack into engagement with the reel rack and immediately afterward freeing the lugs of the retriever head from those of the locking disk. When the centrifugal dog throws up the trip arm, it follows the arm until the curvature of the travel of the dog on the reel brings the trip shoulder inside of the arm and permits it to pass. At the same time the locking bolts have been drawn outward until their ends free the tapered end of the stop collar, when the endwise thrust of the shaft throws the bolts still farther out by the beveled face of the collar until the ends of the bolts ride on the thickest part of the collar. This movement of the locking bolts throws and keeps the trip arm up and clear beyond the trip shoulders of the centrifugal dogs when the dogs are thrown out against their limiting stop pins. The retriever spring is thus brought into action and immediately winds the rope on the reel and brings the trolley down below the wire. If this action is not otherwise stopped, the rope will brake the movement when wound to the shallow part of the groove at the end of the reel. When the shifting shaft is thrust endwise, the regulating nut goes with it toward the stop shoulder at the mouth of the collar socket; but as soon as the shaft begins to rotate the shaft screw drives the nut outward to the position shown in Fig. 2. This figure also shows the position of the other parts when the retrieving mechanism is unlocked and the retriever spring has acted. In this relation the tension spring is also in action, the strength of the retriever spring having merely been joined or added to its energy. To re-wind the retriever spring and lock the retrieving mechanism, the rope is pulled out until the reel has rotated the shifting shaft enough to bring the regulating nut in against the stop-shoulder, as shown in Fig. 6, until which time the retriever head lugs clear the locking disk lugs, as shown in Fig. 2. The further movement of the regulating nut being stopped, another half rotation of the shifting shaft draws the retriever head toward the locking disk, and when the stop collar has cleared the ends of the locking bolts the bolts will drop into their normal position by action of the lever spring, as shown in Figs. 1, 3, and 6. At the same time the reel rack is drawn out of its groove in the reel partition by reason of its engagement with the retriever rack, the teeth being slightly beveled, and by the friction of this engagement caused by the energy of the retriever spring, as shown in Fig. 6. The click of the locking bolts dropping in their sockets against the shifting shaft indicates when the winding is completed, and also the contact of the back of the retriever head lugs against the back of the locking disk lugs prevents any further winding. The rope is then permitted to re-wind a half-turn of the reel, which brings the faces of said lugs into contact and locks the retrieving mechanism. This half-turn of the retriever head also turns the shifting shaft so as to move the regulating nut outward from the stop shoulder to its normal position, as shown in Fig. 1 and by broken lines in Fig. 6, thus freeing the shaft for its endwise movement when the retrieving mechanism is again unlocked. When the engagement of the racks is relieved of the pressure of the retriever spring by the locking of the retrieving mechanism, the reel rack is brought back into its groove by the action of its springs, and the reel being thus freed from engagement with the retriever head responds to the action of the tension spring alone.

If it is desired to stop the trip arm so it will not unlock the retrieving mechanism, and thus operate my device merely as a trolley-catcher, I provide the stop lever 92, which is pivoted between the ears 93 on the side of the case above the trip arm and at either side of the aperture 94. The stop lever is held in a given position by means of the spring 95 and the projection 96 entering a depression, in one of the ears. By turning the lever to the position shown by broken lines in Fig. 3 it stops the trip arm and prevents the trip shoulders on the dogs from throwing it up to unlock the retrieving mechanism and also stops the reel from rotating when the centrifugal dogs are thrown out.

What I claim as my invention, and desire to secure by Letters Patent, is:—

1. In a trolley-retriever, a case, a slot in the side of said case, a rotatable reel in said case, a spiral groove on said reel, said groove being formed shallower at one end than elsewhere, and a rope entering in said slot and winding in said groove generally free from the case but impinging it opposite the shallow part of the groove.

2. In a trolley-retriever, a case, a reel in said case, a spiral groove on said reel, said groove being formed shallower at one end than elsewhere, and a slot in the case opposite to and as long as the reel.

3. In a trolley-retriever, a case, a reel in said case, a spiral groove on said reel, and a slot in the case opposite to and as long as the reel, and a rope entering said slot and winding in said groove.

4. In a trolley-retriever, a reel, there being a spiral groove on said reel and said groove being formed shallower at one end than elsewhere.

5. In a trolley-retriever, a case, a rotatable reel on a shaft in said case, a spring acting to rotate said reel, a spring-actuated rotatable retriever-head on an independent shaft in said case, and means for alternately locking said head against rotation and for engaging it with said reel, said locking and engaging being respectively effected by the shifting of said head on its axis.

6. In a trolley-retriever, a case, a rotatable reel in said case, a fixed disk in said case, an independent rotatable retriever-head in said case, a spring acting to rotate said head, and means for alternately engaging said head with said disk and with said reel.

7. In a trolley-retriever, a case, a rotatable reel in said case, a fixed disk in said case, an independent rotatable retriever-head in said case, a spring acting to rotate said head, and means for alternately engaging said head with said disk and with said reel, said engagements being effected by the shifting of said head on its axis.

8. In a trolley-retriever, a rotatable reel, a cross partition in said reel, apertures in said partition, an annular rack on one side of said partition, studs on said rack extending through said apertures, springs acting to hold said rack against said partition, an independent rotatable retriever-head, and an annular rack on said head adapted to engage with and disengage from said reel rack by the shifting of said head on its axis.

9. In a trolley-retriever, a rotatable reel, a cross partition in said reel, apertures in said partition, an annular rack on one side of said partition, studs on said rack extending through said apertures, and springs acting to hold said rack against said partition.

10. In a trolley-retriever, a rotatable reel, a cross partition in said reel, an annular groove in one side of said partition, apertures through said partition from said groove, an annular rack normally in said groove, studs on said rack extend[illegible] through said apertures, and springs acting to hold said rack in said groove.

11. In a trolley-retriever, a case, a rotatable reel on a shaft in said case, a bearing for the outer end of said shaft at one end of the case, a rotatable retriever head on an independent shaft in said case, a bearing for said independent shaft near the other end of the case, and a bearing for the inner end of said reel-shaft in said retriever-head.

12. In a trolley-retriever, a fixed hub, a rotatable shield on said hub, a spring acting to rotate said shield, a rotatable and endwise-shifting shaft in said hub, a retriever-head on said shaft telescoping around said shield, a slit in said head, and a feather on said shield operating in said slit.

13. In a trolley-retriever, a case, a bearing in said case, a shaft in said bearing, a stop-collar on said shaft, a spring acting to shift said shaft endwise, slots in said bearing, levers pivoted to said case, bolts pivoted to said levers respectively operating through said slots, and means for operating said bolts in and out of engagement with said collar thereby respectively stopping or permitting the endwise movement of said shaft.

14. In a trolley-retriever, a case, a bearing in said case, a shaft in said bearing, a stop-collar on said shaft, a beveled face on one end of said collar, a spring acting to shift said shaft endwise, slots in said bearing, levers pivoted to said case, bolts pivoted to said levers respectively operating through said slots, and means for operating said bolts in and out of engagement with said collar thereby respectively stopping or permitting the endwise movement of said shaft.

15. In a trolley-retriever, a case, a bearing in said case, a rotatable shaft in said bearing, a spring acting to shift said shaft endwise, a screw on said shaft, a nut on said screw, a guide to hold said nut from rotating, and a shoulder in said bearing to stop said nut from endwise movement, whereby the shaft by its rotation is shifted endwise against said spring.

16. In a trolley-retriever, a case, a bearing in said case, a rotatable shaft in said bearing, a spring acting to shift said shaft endwise, a screw on said shaft, a nut on said screw, a guide to hold said nut from rotating, a shoulder in said bearing to stop said nut from endwise movement, whereby the shaft by its rotation is shifted endwise against said spring, and bolts adapted to engage said collar to stop said shaft against said spring.

17. In a trolley-retriever, a case, a rotatable reel in said case, a bearing in said case, a shaft in said bearing independent of said reel, a spring acting to shift said shaft endwise, a collar on said shaft, a bolt normally engaging said collar to stop said shaft against said spring, a lever pivoted to said case and to said bolt respectively, a trip-arm on the free end of said lever, a dog pivoted on said reel, a shoulder on said dog adapted to trip said arm when the dog is thrown outward by the rapid rotation of said reel, thereby withdrawing said bolt from said collar, and a spring acting to hold said dog inward free from said arm during the moderate rotation of said reel.

18. In a trolley-retriever, a case, a rotatable reel in said case, a bearing in said case, a shaft in said bearing independent of said reel, a spring acting to shift said shaft endwise, a collar on said shaft, a beveled surface on said collar, a bolt normally engaging said collar to stop said shaft against said spring, a lever pivoted to said case and to said bolt respectively, a trip-arm on the free end of said lever, a dog pivoted to said reel, a shoulder on said dog adapted to trip said arm when the dog is thrown outward by the rapid rotation of said reel, and a spring acting to hold said dog inward free from said arm during the moderate rotation of said reel.

19. In a trolley-retriever, a case, a bearing in said case, a shaft in said bearing, slots in said bearing on either side of said shaft, a collar on said shaft, bolts operating through said slots to engage said collar, levers respectively pivoted to said case, one arm of each lever being pivoted to said bolts respectively and teeth on the other arms mutually meshing whereby the bolts are operated in unison, and means for operating said bolts in and out of engagement with said collar.

20. In a trolley-retriever, a case, a rotatable reel in said case, a normally locked retrieving mechanism in said case, a trip-arm pivoted in said case adapted to unlock said mechanism, and a dog pivoted on said reel adapted when thrown outward by the reel's rapid rotation to trip said arm thereby unlocking said mechanism.

21. In a trolley-retriever, a case, a rotatable reel in said case, a normally locked retrieving mechanism in said case, a trip-arm pivoted in said case adapted to unlock said mechanism, a dog pivoted on said reel adapted when thrown outward by the reel's rapid rotation to engage and trip said arm, and a lever pivoted in said case adapted when thrown in to stop said trip-arm thereby stopping said reel from rotation.

22. In a trolley-retriever, a shaft, a stop-collar on said shaft, a screw on said shaft and a regulating nut on said screw.

23. In a trolley-retriever, a shaft, a stop-collar on said shaft and a beveled surface on said collar.

24. In a trolley retriever the combination with three relatively movable members; one constituting a drum, another a normally stationary member, and another an intermediate member, and a power spring having one end attached to the intermediate member and the other end to one of the other of said members, of means automatically connecting said intermediate member with the drum while the drum is moved in one direction and means automatically connecting said intermediate member, with the normally stationary member while it is moved in the other direction, during the setting of said power spring.

25. In a trolley retriever the combination with three relatively movable members, one constituting a drum, another a normally stationary member, and another an intermediate member, of a power spring normally set in a strained condition, having one end secured to the intermediate member and the other end to one of the other of said members, means to connect the intermediate member with the drum when the drum is turned in one direction, and means to connect the intermediate member with the stationary member when the drum is turned in the opposite direction, thrown into action automatically during the setting of said power spring.

26. In a trolley retriever the combination with three relatively movable members, one constituting a drum, another a normally stationary member and the third an intermediate member, and a power spring having one end secured to said intermediate member and the other end to one of the other members, and holding means automatically thrown into action to hold said intermediate member to said drum while the drum is turned in one direction and holding means automatically thrown into action to hold said intermediate member to said normally stationary member while it is turned in the opposite direction during the setting of the power spring.

27. In a trolley retriever the combination with three relatively movable members, one constituting a drum, another a normally stationary member and the third an intermediate member and a power spring having one end secured to said intermediate member and the other end to one of the other members, and holding means automatically thrown into action to hold said intermediate member to said drum while the drum is turned in one direction and holding means automatically thrown into action to hold said intermediate member to said normally stationary member while it is turned in the opposite direction, and means for automatically throwing the holding means between said intermediate member and one of the other said members out of action when the power spring has been set to a predetermined limit.

28. In a trolley retriever the combination with a drum adapted to receive the trolley rope, of a spring, normally under strain and adapted to be thrown into action by the sudden acceleration or rapid rotation of said drum to wind up the trolley rope, and means automatically thrown into action during said action of said spring whereby the unwinding of the rope from said drum will wind up or set said spring.

29. In a trolley retriever the combination with a drum of a power spring adapted to be thrown into action by the rotation of said drum, to wind up the trolley rope, of means automatically thrown into action during the winding up of said trolley rope to cause the unwinding of rope from said drum to reset said power spring.

30. In a trolley retriever the combination with two relatively movable members, one constituting a drum and the other a normally stationary member, and a power spring having one of its ends secured to one of said members, of mechanism automatically connecting the other end of said power spring with the drum when the drum is turned in one direction and with said normally stationary member when the drum is turned in the opposite direction, during the setting of said power spring.

In testimony whereof, I have signed my name to this specification in the presence of two subscribing witnesses.

ALFRED W. KNUTSON.

Witnesses:

HENRY T. RAMP,
S. B. EVERHART.